(12) United States Patent
Koyama

(10) Patent No.: US 9,650,144 B2
(45) Date of Patent: May 16, 2017

(54) AIRCRAFT LAVATORY UNIT INSTALLATION METHOD AND AIRCRAFT

(71) Applicant: The Yokohama Rubber Co., LTD., Minato-ku, Tokyo (JP)

(72) Inventor: Takashi Koyama, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 31 days.

(21) Appl. No.: 14/380,661

(22) PCT Filed: Feb. 20, 2013

(86) PCT No.: PCT/JP2013/000951
§ 371 (c)(1),
(2) Date: Aug. 22, 2014

(87) PCT Pub. No.: WO2013/125218
PCT Pub. Date: Aug. 29, 2013

(65) Prior Publication Data
US 2015/0298810 A1    Oct. 22, 2015

(30) Foreign Application Priority Data

Feb. 23, 2012   (JP) ................................. 2012-037147

(51) Int. Cl.
*B64D 11/00*   (2006.01)
*B64D 11/02*   (2006.01)
(Continued)

(52) U.S. Cl.
CPC ............... *B64D 11/02* (2013.01); *B64C 1/20* (2013.01); *B64D 11/064* (2014.12); *B64F 5/00* (2013.01);
(Continued)

(58) Field of Classification Search
None
See application file for complete search history.

(56) References Cited

U.S. PATENT DOCUMENTS 5,083,727 A   1/1992  Pompei et al.
5,090,639 A * 2/1992  Miller ..................... B64D 9/00
                                              244/118.1
(Continued)

FOREIGN PATENT DOCUMENTS

EP   2 316 733     5/2011
JP   2005-067600   3/2005
(Continued)

OTHER PUBLICATIONS

International Search Report dated May 28, 2013, 4 pages, Japan.

*Primary Examiner* — Medhat Badawi
(74) *Attorney, Agent, or Firm* — Thorpe North & Western

(57) ABSTRACT

A body frame of an aircraft lavatory unit includes a front wall having an entrance opened and closed off by a door, side walls on both sides, and a floor surface. The outer surface of the side wall positioned closer to the front constitutes a wall facing backrests of a rear seat row and extending in a latitudinal direction. The lavatory unit is capable of being disposed at a front position in which the wall is disposed behind and near the backrests of the seats of the rear seat rows with the backrests being in an upright position, and at a rear position in which the wall is disposed behind and near the backrests of the rear seat rows of the seats with the backrests being in a reclining position.

3 Claims, 9 Drawing Sheets

(51) Int. Cl.
  *B64C 1/20* (2006.01)
  *B64F 5/00* (2017.01)
  *B64C 1/18* (2006.01)
  *B64D 11/06* (2006.01)

(52) U.S. Cl.
  CPC ............ *B64C 1/18* (2013.01); *B64D 11/0601* (2014.12); *B64D 11/0696* (2013.01); *B64D 2011/0046* (2013.01)

(56) References Cited

U.S. PATENT DOCUMENTS

| | | | |
|---|---|---|---|
| 6,007,025 A | 12/1999 | Coughren et al. | |
| 6,079,669 A | 6/2000 | Hanay et al. | |
| 6,152,400 A * | 11/2000 | Sankrithi | B64D 11/00 105/315 |
| 6,454,209 B1 * | 9/2002 | Bock | B60Q 3/025 105/314 |
| 6,932,297 B1 * | 8/2005 | Steindl | B64D 9/003 244/118.1 |
| 7,523,888 B2 | 4/2009 | Ferry | B60N 2/206 244/118.6 |
| 7,905,451 B2 * | 3/2011 | Schotte | B64D 11/00 244/118.6 |
| 8,297,554 B2 * | 10/2012 | Schotte | B64D 11/00 244/118.6 |
| 8,770,659 B2 * | 7/2014 | Isherwood | B64D 11/0691 297/14 |
| 9,016,626 B2 * | 4/2015 | Schliwa | B61D 35/00 244/118.5 |
| 9,056,682 B2 * | 6/2015 | Ehlers | B64D 11/02 |
| 2003/0062449 A1 * | 4/2003 | Sankrithi | B64C 1/00 244/118.6 |
| 2005/0082430 A1 | 4/2005 | Young et al. | |
| 2005/0103935 A1 * | 5/2005 | Sprenger | B64D 11/00 244/118.6 |
| 2005/0241062 A1 * | 11/2005 | Quan | E03C 1/01 4/664 |
| 2006/0202085 A1 * | 9/2006 | Schotte | B64D 11/00 244/119 |
| 2007/0102579 A1 * | 5/2007 | Krieglsteiner | B64D 11/00 244/129.1 |
| 2008/0179456 A1 | 7/2008 | Diergardt | |
| 2009/0283636 A1 | 11/2009 | Saint-Jalmes et al. | |
| 2010/0163674 A1 * | 7/2010 | Bock | B64D 11/06 244/118.6 |
| 2011/0101160 A1 | 5/2011 | Gomes et al. | |
| 2011/0101161 A1 * | 5/2011 | Saint-Jalmes | B64D 11/0601 244/118.6 |
| 2011/0121134 A1 * | 5/2011 | Schotte | B64D 11/00 244/118.5 |
| 2011/0253835 A1 | 10/2011 | Cook et al. | |
| 2012/0048998 A1 * | 3/2012 | Schliwa | B64D 11/00 244/118.6 |
| 2012/0325964 A1 * | 12/2012 | Hawkins | B64D 11/02 244/118.6 |
| 2013/0105626 A1 * | 5/2013 | Drews | B64D 11/00 244/118.5 |
| 2013/0206907 A1 * | 8/2013 | Burrows | B64D 11/02 244/118.5 |
| 2014/0008492 A1 * | 1/2014 | Ehlers | B64D 11/00 244/118.5 |
| 2014/0158825 A1 | 6/2014 | Cook et al. | |
| 2015/0239563 A1 | 8/2015 | Cook et al. | |
| 2015/0239564 A1 | 8/2015 | Cook et al. | |

FOREIGN PATENT DOCUMENTS

| | | |
|---|---|---|
| JP | 2005-263214 | 9/2005 |
| JP | 2007-508980 | 4/2007 |
| WO | WO 2010/108775 | 9/2010 |
| WO | WO 2011/133576 | 10/2011 |

\* cited by examiner

AIRCRAFT LAVATORY UNIT INSTALLATION METHOD AND AIRCRAFT

TECHNICAL FIELD

The present technology relates to an aircraft lavatory unit installation method and to an aircraft.

BACKGROUND

US Patent Publication Nos. 2008/0179456 A1 and 2009/0283636 A1 propose making various types of equipment installed within an aircraft movable so that the layout of the equipment within the aircraft can be altered, an example of a piece of such movable equipment being a lavatory unit constituting a lavatory provided with a sink, a toilet, and the like.

SUMMARY

A plurality of seats, a plurality of lavatory units, a plurality of galleys, and the like are disposed in the limited space within the fuselage of an aircraft.

In order to increase the number of seats, one conceivable strategy is to reduce the size of the lavatory units and install seats in the space so obtained, but there is a limit to the degree to which the size of a lavatory unit can be reduced. In addition, it is not possible to increase the number of seats simply by moving the lavatory units around, as in the case of the prior art described above.

The seats, meanwhile, have a reclining function, with the backrests thereof being configured so as to be capable of being placed in an upright position and a reclining position. When the backrest of a seat is in the upright position, the space behind the seat backrest that is used for the reclining position is unoccupied.

The space behind a backrest formed when the backrest is in the upright position was the focus in conceiving the present technology, which provides an aircraft lavatory unit installation method and an aircraft that are advantageous for increasing the number of seats.

An example of the present technology is an aircraft comprising: a longitudinal aisle extending along a longitudinal direction of a fuselage in an intermediate position with respect to a latitudinal direction of the fuselage; a seat group in which a plurality of seat rows, the seat rows including a plurality of seats facing the front of the fuselage and arranged in rows along the latitudinal direction of the fuselage, is arranged in rows along the longitudinal direction of the fuselage on left and right sides of the longitudinal aisle; a latitudinal aisle extending in the latitudinal direction from a boarding entrance of the fuselage behind the seat group and connecting to the longitudinal aisle; and a lavatory unit provided between the latitudinal aisle and a rear seat row at a rearmost position in the seat group, the unit having a wall facing backrests of the rear seat group, wherein, during takeoff and landing, the lavatory unit is disposed at a front position in which the wall is positioned near the backrests of the seats of the rear seat row with the backrests set to an upright position, and, when the aircraft is not taking off or landing, the lavatory unit is disposed at a rear position in which the wall is positioned near the backrests of the seats of the rear seat row with the backrests set to a reclining position.

Another example of the present technology is an aircraft comprising: a longitudinal aisle extending along a longitudinal direction of a fuselage in an intermediate position with respect to a latitudinal direction of the fuselage; a seat group in which a plurality of seat rows, the seat rows including a plurality of seats facing the front of the fuselage and arranged in rows along the latitudinal direction of the fuselage, is arranged in rows along the longitudinal direction of the fuselage on left and right sides of the longitudinal aisle; a latitudinal aisle extending in the latitudinal direction from a boarding entrance of the fuselage behind the seat groups and connecting to the longitudinal aisle; and a lavatory unit provided between the latitudinal aisle and a rear seat row at a rearmost position in the seat group, the unit having a wall facing backrests of the rear seat group, wherein the lavatory unit is provided so as to be capable of being disposed at a front position in which the wall is positioned near the backrests of the seats of the rear seat row with the backrests set to an upright position and at a rear position in which the wall is positioned near the backrests of the seats of the rear seat row with the backrests set to a reclining position.

According to the present technology, the lavatory unit is disposed at a front position in which the wall is positioned near the backrests of the rear seat row with the backrests set to an upright position during takeoff and landing, and to a rear position in which the wall is positioned near the backrests of the rear seat row with the backrests set to a reclining position when the aircraft is not taking off or landing.

Specifically, the present technology utilizes the excess space formed behind the backrests of the seats of the rear seat row during takeoff and landing, when the backrests are in an upright position, as space in which to dispose a lavatory unit, and utilizes part of the space of the latitudinal aisle which is not frequently used as space in which to dispose the lavatory unit when the aircraft is not taking off or landing.

This is advantageous for increasing the number of seat rows arranged in the longitudinal direction compared to a conventional fuselage in which the lavatory unit is immovably disposed.

DETAILED DESCRIPTION

First Embodiment

Next, a lavatory unit installation method and an aircraft according to an embodiment of the present technology will be described with reference to the drawings.

Figure 1:
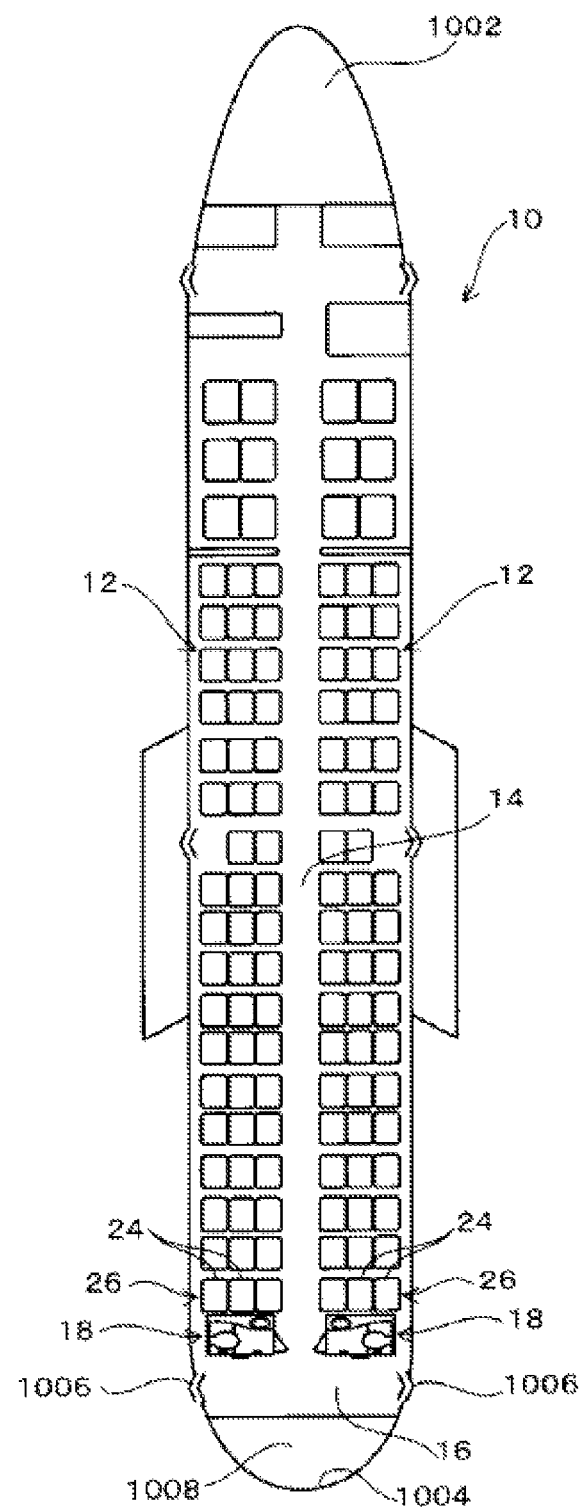
FIG. 1 is an explanatory view illustrating an interior layout of an aircraft according to a first embodiment.
Figure 4:
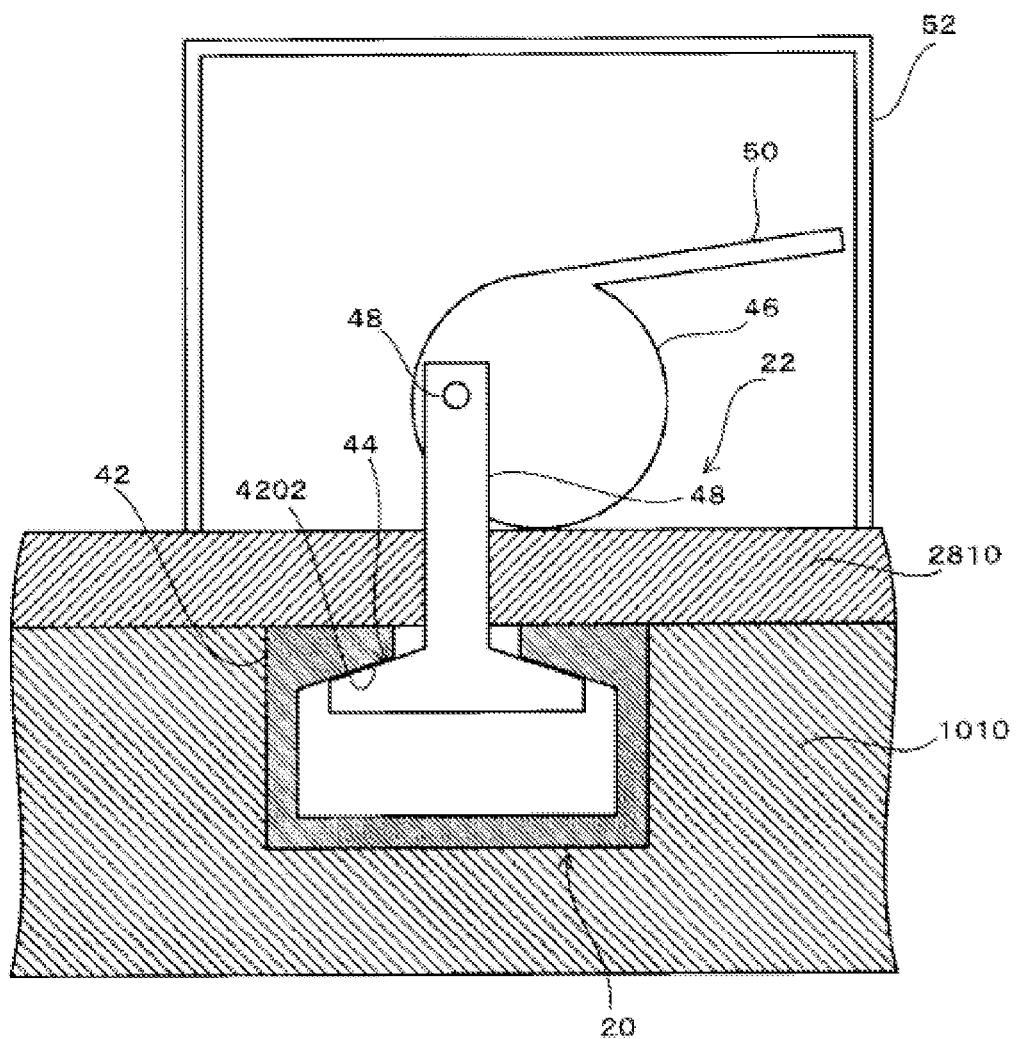
FIG. 4 is an explanatory view of a guide mechanism 20 and an anchoring mechanism 22 illustrating a seat track 42 and a top-shaped member 44 constituting an engaging member in an engaged state in the first embodiment.
Figure 5:
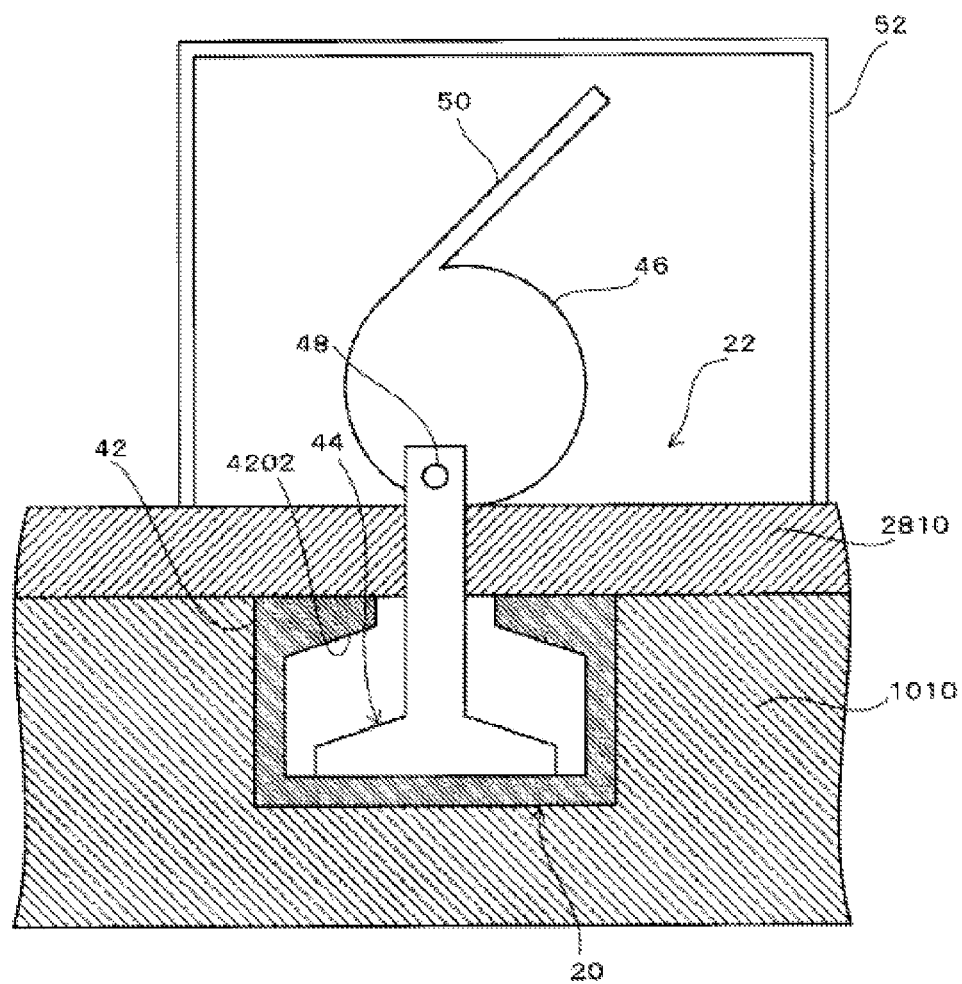
FIG. 5 is an explanatory view of a guide mechanism 20 and an anchoring mechanism 22 illustrating a seat track 42 and a top-shaped member 44 constituting an engaging member in a disengaged state in the first embodiment.

As illustrated in FIG. 1, a fuselage 10 of the aircraft includes seat groups 12, a longitudinal aisle 14, a latitudinal aisle 16, and a lavatory unit 18, and, as illustrated in FIGS. 4 and 5, a guide mechanism 20 and an anchoring mechanism 22.

A cockpit 1002 constitutes the front part of the fuselage 10 of the aircraft, and a pressure bulkhead 1004 constitutes the rear part thereof. Between the front and rear parts are provided the seat groups 12, the longitudinal aisle 14, the latitudinal aisle 16, and the lavatory unit 18. In the drawings, 1006 is a boarding entrance, and 1008 is a galley.

The longitudinal aisle 14 extending in a longitudinal direction of the fuselage 10 is provided in an intermediate position along the latitudinal direction (width direction) of the fuselage 10, and the seat groups 12 are provided on the left and right sides of the longitudinal aisle 14.

The seat groups 12 are constituted by a plurality of seat rows arranged in rows along the longitudinal direction of the fuselage 10, the rows including a plurality of seats 24 facing the front of the fuselage 10 and arranged in rows along the latitudinal direction of the fuselage 10.

The seat rows positioned at the rear sides of the seat groups 12 are constituted by three seats 24 linked into a whole.

Figure 2:
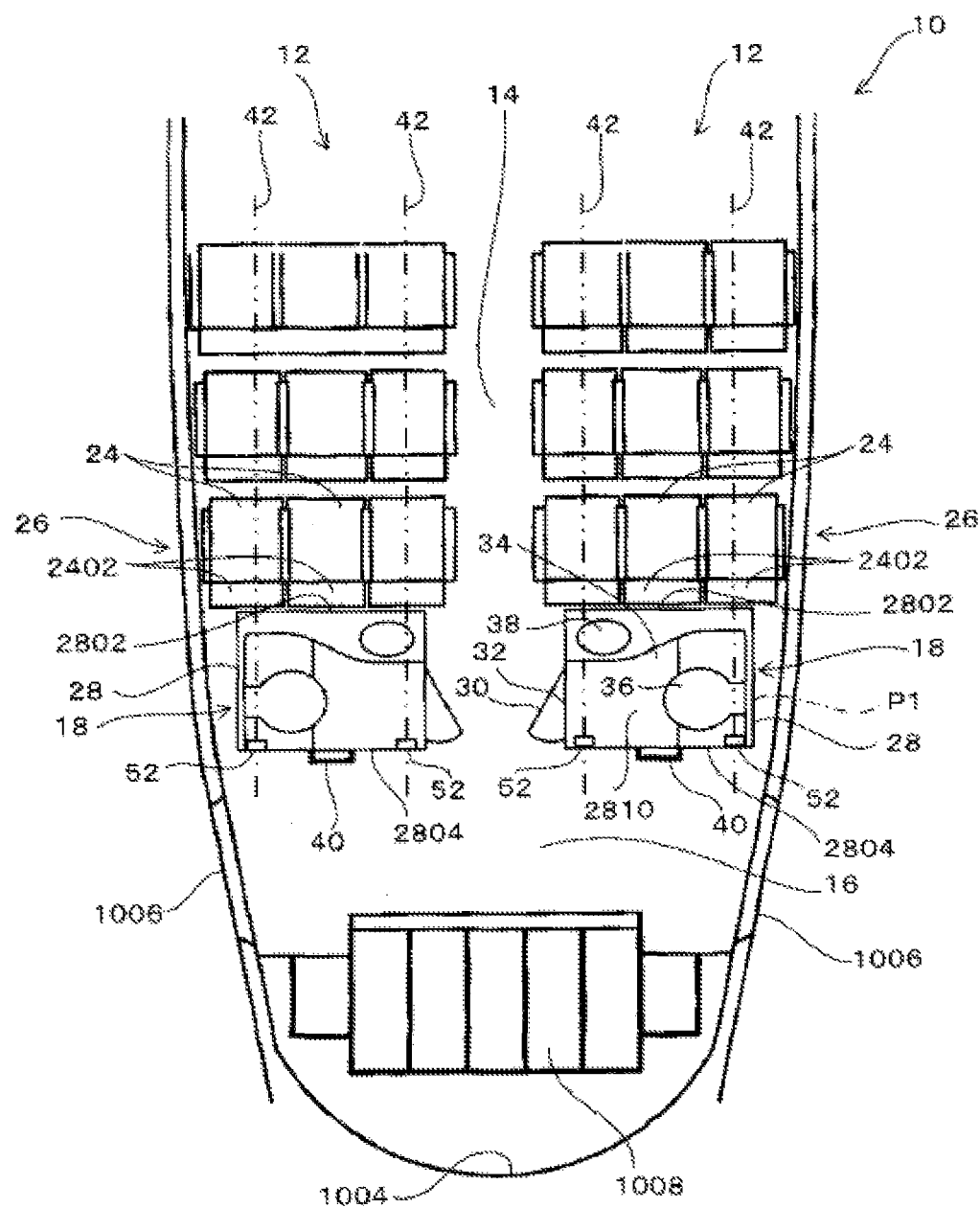
FIG. 2 is an explanatory view illustrating a lavatory unit 18 according to the first embodiment in a front position P1.
Figure 3:
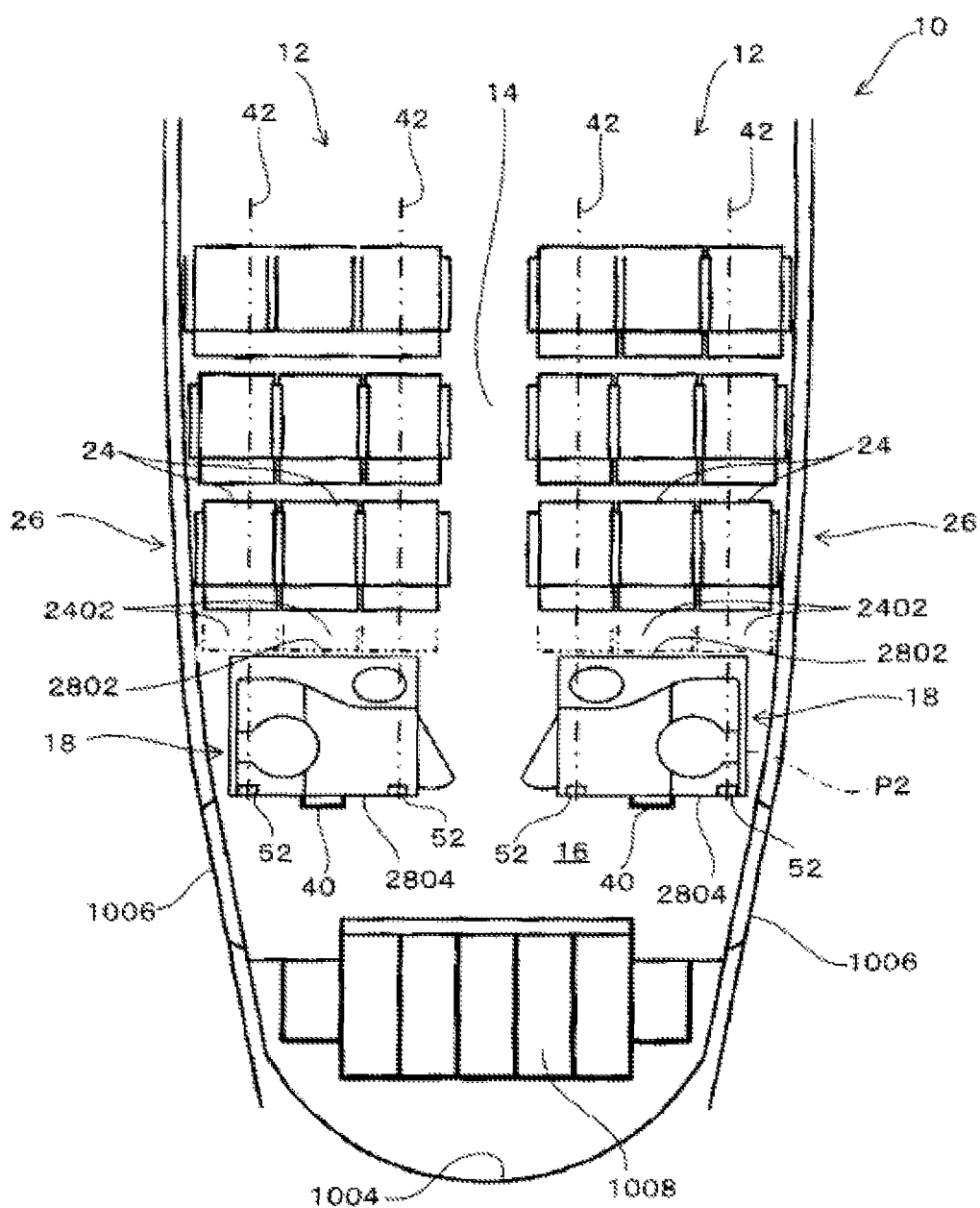
FIG. 3 is an explanatory view illustrating the lavatory unit 18 according to the first embodiment in a rear position P2.

The seats 24 have a reclining function, and, as illustrated in FIGS. 2 and 3, backrests 2402 thereof are capable of being placed into an upright position and a reclining position.

The latitudinal aisle 16 extends in the latitudinal direction from boarding entrances 1006 of the fuselage 10 behind the seat groups 12, and connects with the longitudinal aisle 14.

The lavatory unit 18 is provided on the floor of the fuselage 10.

The lavatory unit 18 is provided between the latitudinal aisle 16 and rear seat rows 26 provided at rearmost positions of the seat groups 12.

As illustrated in FIG. 2, the lavatory unit 18 includes a body frame 28.

The body frame 28 includes a front wall having an entrance 32 that is opened and closed off by a door 30, a rear wall facing the front wall, side walls connecting both sides of the front wall and both sides of the rear wall, and a floor surface 2810.

A lavatory 34 is provided within the body frame 28 by the front wall, the rear wall, the side walls on both sides, and the floor surface 2810, the lavatory 34 being provided with a toilet 36 and a sink 38.

The outer surface of the side wall positioned toward the front of the fuselage 10 constitutes a wall 2802 extending in the latitudinal direction of the fuselage 10 and facing the backrests 2402 of the rear seat row 26, and the outer surface of the side wall positioned toward the rear of the fuselage 10 constitutes a wall 2804 extending in the latitudinal direction and facing the latitudinal aisle 16.

The lavatory unit 18 is capable of being disposed at a front position P1 in which the wall 2802 is disposed behind and near the backrests 2402 of the seats 24 of the rear seat rows 26 with the backrests being in the upright position, as illustrated in FIG. 2, and at a rear position P2 in which the wall 2802 is disposed behind and near the backrests 2402 of the rear seat rows 26 of the seats 24 with the backrests being in the reclining position, as illustrated in FIG. 3.

Each lavatory unit 18 is provided with a handle 40 on the wall 2804 facing the latitudinal aisle 16 for moving the lavatory unit.

FIGS. 4 and 5 are explanatory views illustrating the configurations of the guide mechanism 20 and the anchoring mechanism 22.

The guide mechanism 20 serves to guide the lavatory unit 18 in the longitudinal direction over the floor 1010 between the front position P1 and the rear position P2.

A seat track 42 provided with an engagement groove 4202 for attaching the seats is provided extending in the longitudinal direction on the floor 1010 of the fuselage 10, and the guide mechanism 20 includes the seat track 42 and a top-shaped member 44, provided on the lavatory unit 18 side, for engaging with the seat track 42.

The top-shaped member 44 is thus capable of moving within the engagement groove 4202, thereby guiding the lavatory unit 18 in the longitudinal direction of the fuselage 10.

The anchoring mechanism 22 releasably anchors the lavatory unit 18 to the floor 1010 at the front position P1 and the rear position P2.

The anchoring mechanism 22 includes the engagement groove 4202 and a disc-shaped or cylindrical cam 46 with lever.

The top-shaped member 44 is hingeably mounted to a position of the disc-shaped cam 46 set off from the center thereof by a shaft 48, and a lever 50 projects from the outer circumference of the cam 46 in a tangential direction.

Each lavatory unit 18 is provided with two levers 50 spaced apart from each other with respect to the direction in which the latitudinal aisle 16 extends on the floor surface 2810 of the lavatory unit 18 by the wall 2804 positioned opposite the wall 2802, the levers 50 being housed in housings 52.

As illustrated in FIG. 4, lowering the levers 50 raises the top-shaped members 44 so that upper edges of the top-shaped members 44 are kept in contact with the engagement groove 4202.

As illustrated in FIG. 5, raising the levers 50 lowers the top-shaped members 44 so that the contact between the upper edges of the top-shaped members 44 and the engagement groove 4202 is released.

Thus, when the levers 50 are lowered, the lavatory unit 18 is immovably anchored to the seat track 42, and when the levers 50 are raised, the lavatory unit 18 is capable of moving in the direction in which the seat track 42 extends.

The engagement grooves 4202 of the seat tracks 42 have multiple broad-width sections into and out of which the top-shaped members 44 can be inserted and removed provided at a predetermined pitch; thus, in this embodiment, the lavatory unit 18 is immovably anchored in the seat track 42 in a part of the engagement groove 4202 between adjacent broad-width sections.

Next, a method of installing the lavatory unit 18 according to this embodiment will be described.

During takeoff and landing, the lavatory unit 18 is disposed at the front position P1 (FIG. 2).

If the backrests 2402 of the seats 24 of the rear seat rows 26 are in the reclining position, the backrests 2402 are set to the upright position.

If the lavatory unit 18 is disposed at the rear position P2 (P3), the levers 50 are raised, and the handles 40 are used to push the lavatory unit 18 toward the front of the fuselage 10 to the front position P1. The levers 50 are then lowered to immovably anchor the lavatory unit 18 in the seat tracks 42 at the front position P1.

When the aircraft is not taking off or landing, the lavatory unit 18 is disposed at the rear position P2 (FIG. 3).

If the lavatory unit 18 is disposed at the front position P1 (FIG. 2), the levers 50 are raised and the handles 40 are used to pull the lavatory unit 18 toward the rear of the fuselage 10 to the rear position P2. The levers 50 are then lowered to immovably anchor the lavatory unit 18 in the seat tracks 42 at the rear position P2.

Disposing the lavatory unit 18 at the rear position P2 (FIG. 3) allows the backrests 2402 of the seats 24 of the rear seat rows 26 to be placed in the reclining position.

As a result, when the aircraft is not taking off or landing, the backrests 2402 of the seats 24 of the rear seat rows 26 can be moved between the upright position and the reclining position, like the backrests 2402 of the seats 24 of the other seat rows, allowing the backrests 2402 of the seats 24 of the rear seat rows 26 to be used without impediment.

In this embodiment, the excess space formed behind the backrests 2402 of the seats 24 of the rear seat rows 26 is used during takeoff and landing, when the backrests are in an upright position, as space in which to dispose the lavatory units, and part of the space of the latitudinal aisle which is not frequently used is used as space in which to dispose the lavatory units when the aircraft is not taking off or landing.

This is advantageous for increasing the number of seat rows arranged in the longitudinal direction compared to a conventional fuselage in which the lavatory unit 18 is immovably disposed.

Reducing the longitudinal spacing between seat rows by, for example, a few inches, such as 1 or 2 inches, allows the number of seat rows to be increased by one or more over a conventional aircraft.

Second Embodiment

Next, a second embodiment will be described.

In the following embodiment, parts that are identical or similar to the first embodiment will be identically numbered, and description thereof will be omitted or shortened.

In the second embodiment, the guide mechanism 20 and the anchoring mechanism 22 are configured differently from the first embodiment.

Figure 6:
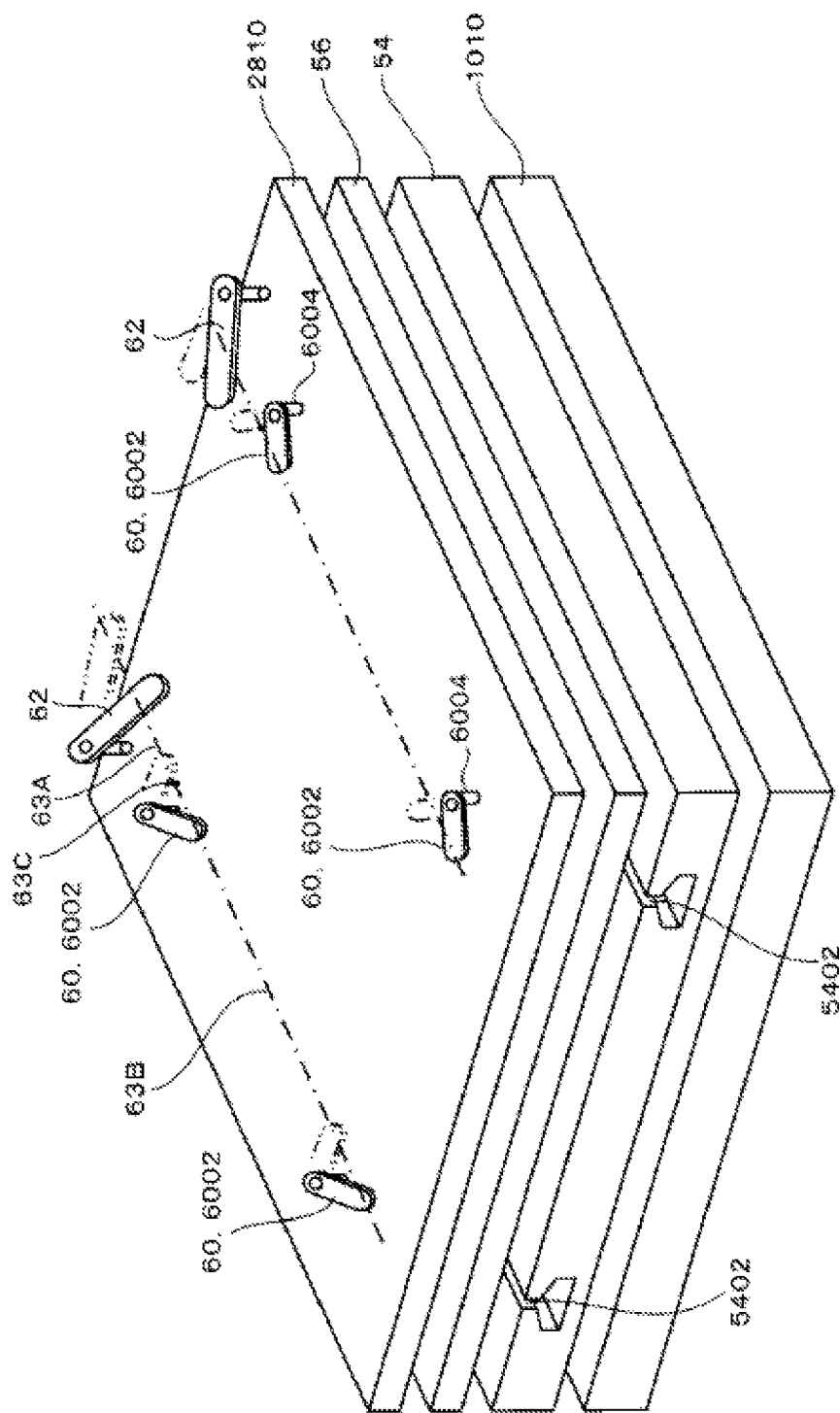
FIG. 6 is an exploded perspective view illustrating the configurations of a guide mechanism 20 and an anchoring mechanism 22 according to a second embodiment.
Figure 7:
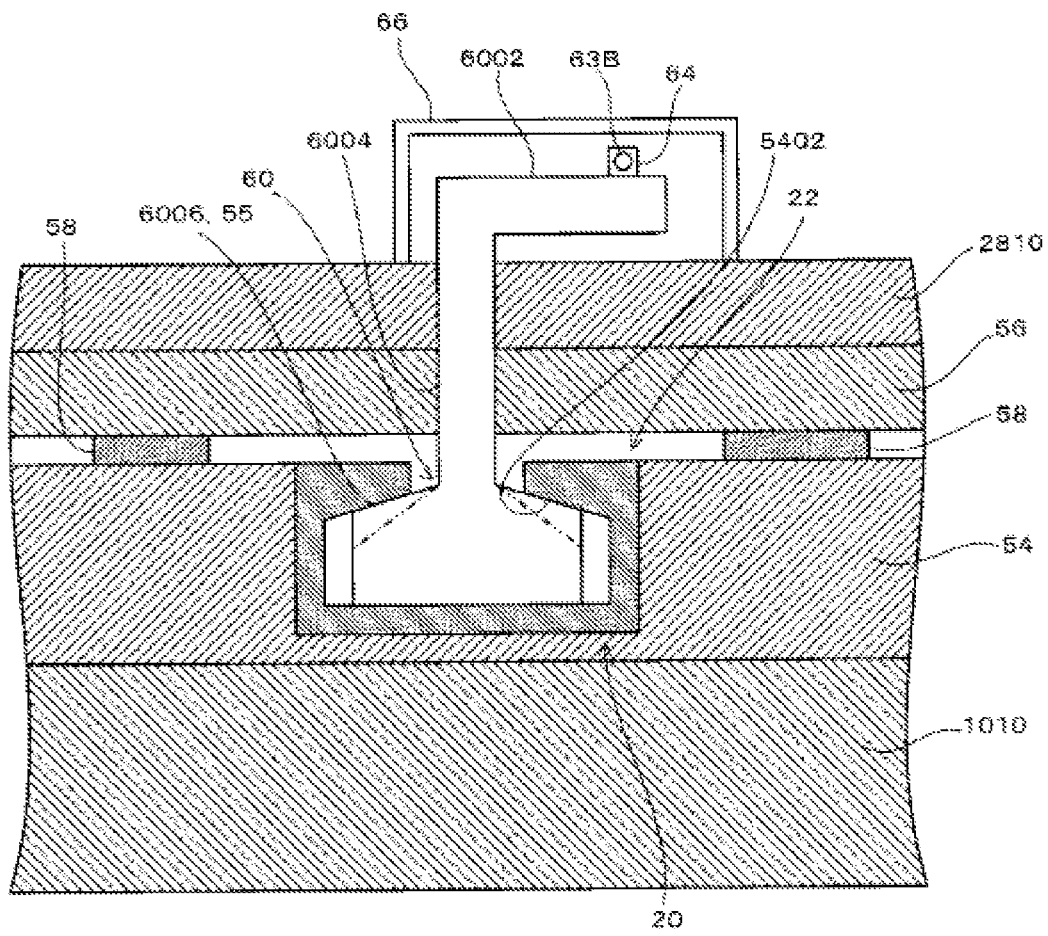
FIG. 7 is an explanatory view of the guide mechanism 20 and the anchoring mechanism 22 according to the second embodiment.

As illustrated in FIGS. 6 and 7, the guide mechanism 20 according to the second embodiment includes a guide plate 54 and an engaging member 55.

The guide plate 54 is attached to the upper surface of the floor 1010 of the fuselage 10.

The guide plate 54 is provided with engagement grooves 5402 serving as guide sections for guiding the lavatory unit 18 in the cross direction, and the engagement grooves 5402 extend in the longitudinal direction with uniform widths throughout.

A reinforcement plate 56 for reinforcing the floor of the lavatory unit 18 is attached to the underside of the floor surface 2810 of the lavatory unit 18, and low-friction members 58 that slidably contacts the upper surface of the guide plate 54 are attached to the under surface of the reinforcement plate 56.

The low-friction members 58 are formed from a material having a low frictional coefficient with respect to the upper surface of the guide plate 54, examples of such materials including known synthetic resin materials such as nylon or polyoxymethylene (POM).

The anchoring mechanism 22 includes engagement grooves 5402, cams 60 with levers, and operation levers 62.

The cams 60 with levers include levers 6002 exposed above the floor surface 2810 of the lavatory unit 18, shaft parts 6004 passing through the floor surface 2810 and the reinforcement plate 56, and cam parts 6006 provided on the lower ends of the shaft parts 6004.

The cam parts 6006 are configured so as to be capable of being placed in a movable state in which the cam parts are engaged with the engagement grooves 5402 so as to be capable of moving along the longitudinal direction in the engagement grooves 5402, as indicated by the double-dotted-dashed line, and an immovable state in which the cam parts are rotated 90° around the shaft parts 6004 from the movable state to engage with the engagement grooves 5402, thereby preventing the movement of the cam parts 6006 within the engagement grooves 5402, as indicated by the solid lines. As such, the cam parts 6006 constitute engaging members 55 for engaging with the engagement grooves 5402, which constitute guide section. The engaging members 55 are coupled to the body frame 28 (FIG. 1) and slidably engage the lavatory unit 18 in a track defined by the guide mechanism 20 coupled to the floor 1010 of the fuselage 10 of the aircraft.

Each of the lavatory unit 18 is provided with two cams 60 with levers 62 for operating the anchoring mechanism 22, the levers 62 separated from each other with respect to the longitudinal direction of the fuselage 10 at two locations on the floor surface 2810 separated from each other with respect to the latitudinal direction of the fuselage 10.

The operation levers 62 are provided at two locations separated from each other with respect to the latitudinal direction of the fuselage 10 on the floor surface 2810.

Each of the operation levers 62 is coupled to two cams 60 with levers arranged in the longitudinal direction of the fuselage 10 via rods 63A, 63B. Specifically, a first end of the rod 63A is coupled to one of the operation levers 62 via a universal joint. A second end of the rod 63A is rotatably coupled to a first end of the rod 63B by a hinge section 63C. The rod 63B is coupled to the levers 6002 of two cams 60 with levers via a universal joint 64.

In a first swinging state of the operation lever 62, the cam parts 6006 of the two cams 60 with levers are in the movable state, and, in a second swinging state of the operation lever 62, the cam parts 6006 of the two cams 60 with levers are in the immovable state.

Thus, when the two operation levers 62 are put into the first swinging state, the lavatory unit 18 is movable in the longitudinal direction, and when the two operation levers 62 are put into the second swinging state, the lavatory unit 18 is immovable in the longitudinal direction.

The cams 60 with levers, operation levers 62, and rods 63A, 63B are covered by a cover 66.

Next, a method of installing the lavatory unit 18 according to the second embodiment will be described.

During takeoff and landing, the lavatory unit 18 is disposed at the front position P1.

If the lavatory unit 18 is disposed at the rear position P2, the operation levers 62 are swung to the first swinging state, and the handles 40 are used to push the lavatory unit 18 toward the front of the fuselage 10 to the front position P1. The operation levers 62 are then swung to the second swinging state, immovably anchoring the lavatory unit 18 in the engagement grooves 5402 at the front position P1.

When the aircraft is not taking off or landing, the lavatory unit 18 is disposed at the rear position P2.

If the lavatory unit 18 is disposed at the front position P1, the operation levers 62 are swung to the first swinging state, and the handles 40 are used to pull the lavatory unit 18 toward the rear of the fuselage 10 to the rear position P2. The operation levers 62 are then swung to the second swinging state, immovably anchoring the lavatory unit 18 in the engagement grooves 5402 at the rear position P2.

In the second embodiment, as in the case of the first embodiment, the excess space formed behind the backrests 2402 during takeoff and landing are used as space in which to dispose the lavatory units, and, when the aircraft is not taking off or landing, part of the space of the latitudinal aisle 16 which is infrequently used is used as space in which to dispose the lavatory units, which is advantageous for increasing the number of longitudinally arranged seat rows compared to a conventional fuselage 10 in which the lavatory unit 18 is immovably installed.

In addition, the engagement grooves 5402 of the second embodiment have uniform widths along the longitudinal direction, allowing the cam parts 6006 to be anchored in the engagement grooves 5402 at a desired location along the direction in which the engagement grooves 5402 extend (i.e., the longitudinal direction). This advantageously increases the freedom with which the front position P1 and the rear position P2 of the lavatory unit 18 can be set.

Moreover, the low-friction members 58 attached to the sides of the lavatory unit 18 in the second embodiment slide along the guide plates 54 attached to the floor 1010 of the fuselage 10, thereby allowing the lavatory unit 18 to be moved between the front position P1 and the rear position P2 with only a small amount of force and advantageously facilitating the process of moving the lavatory unit 18.

In the first and second embodiments, one lavatory unit 18 is disposed behind a rear seat row 26 and moved between the front position P1 and the rear position P2, when the aircraft is taking off or landing or not taking off or landing, but a configuration in which multiple lavatory units 18 are moved is also acceptable. In this context, "multiple lavatory units 18" encompasses both cases in which a plurality of individual lavatory units 18 is provided and cases in which a plurality of lavatories 34 is provided within a single lavatory unit 18.

Figure 8:
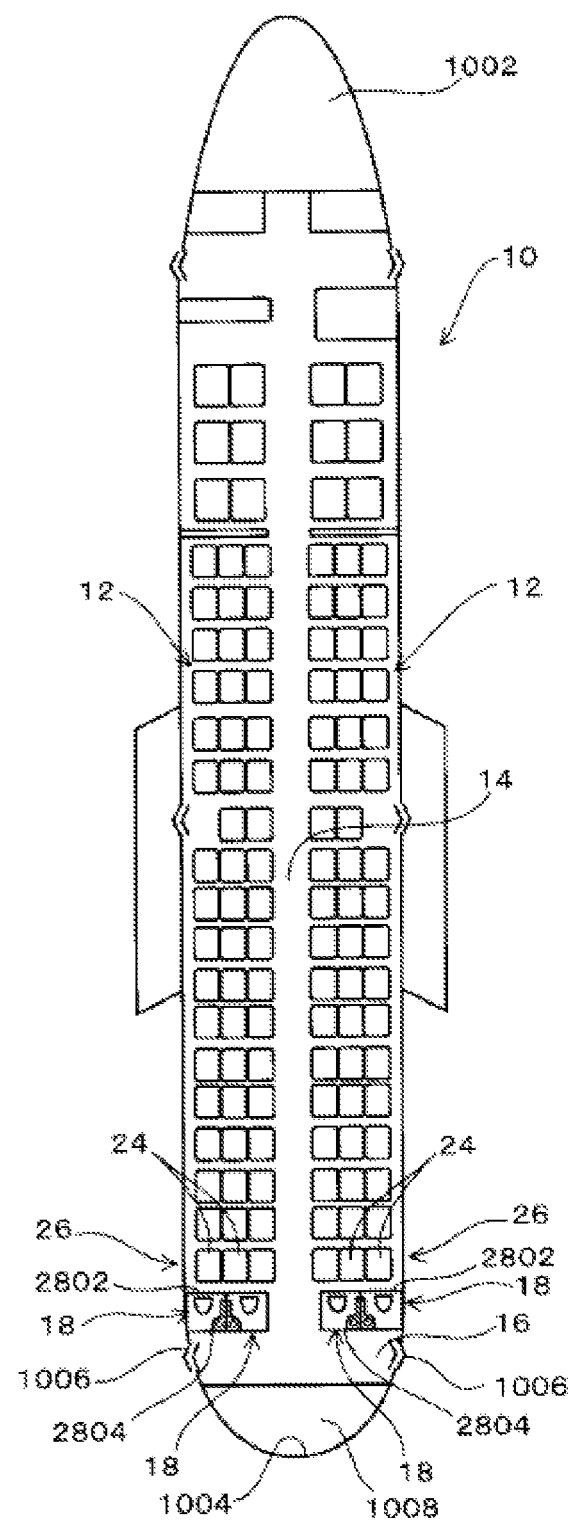
FIG. 8 is an explanatory view illustrating a layout of the interior of an aircraft in which a plurality of lavatory unit 18 is arranged in a row in a latitudinal direction.
Figure 9:
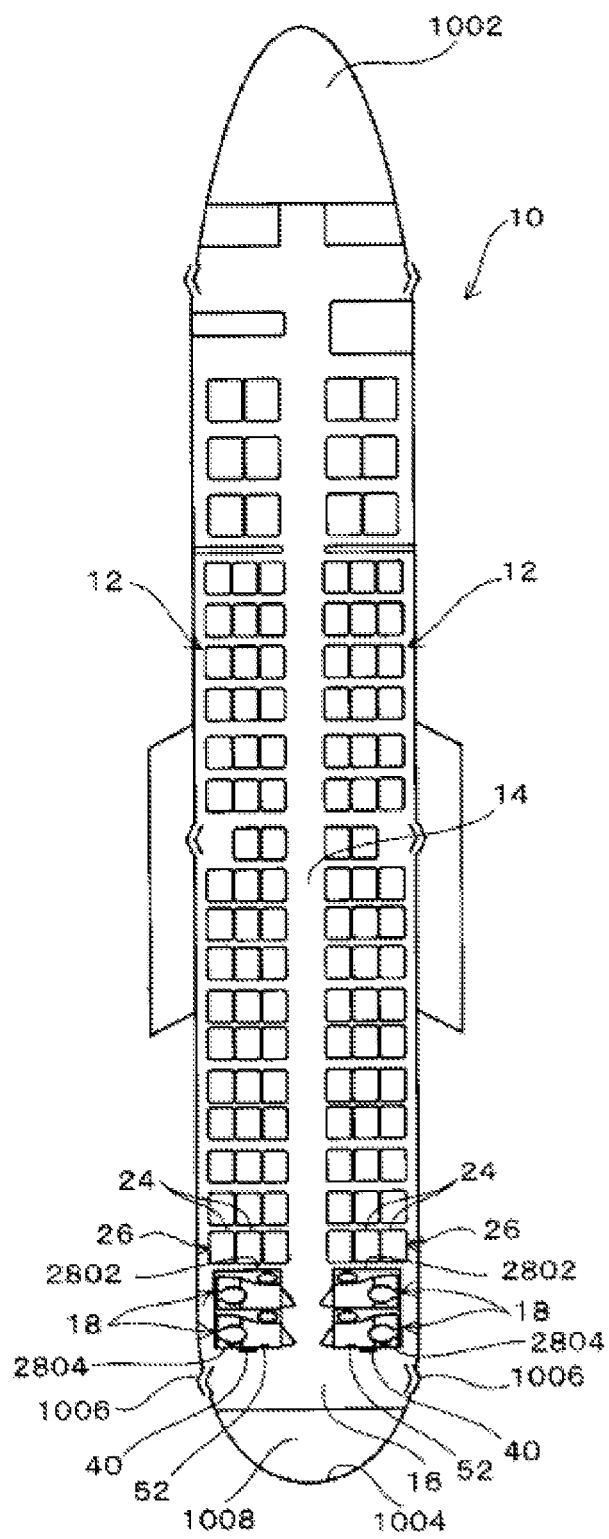
FIG. 9 is an explanatory view illustrating a layout of the interior of an aircraft in which a plurality of lavatory unit 18 is arranged in a row in a longitudinal direction.

FIGS. 8 and 9 illustrate cases in which multiple (i.e., two) lavatory units 18 are moved.

In the example illustrated in FIG. 8, a plurality of lavatory units 18 is arranged in a row in the latitudinal direction behind the rear seat rows 26.

The outer surfaces of the forward-facing rear walls of the plurality of lavatory units 18 constitute walls 2802 extending in the latitudinal direction with respect to the backrests 2402 of the rear seat rows 26, and the outer surfaces of the rearward-facing front walls constitute walls 2804 facing the latitudinal aisle 16.

In this example, the lavatory units 18 may be moved to the front position P1 during takeoff and landing and to the rear position P2 when not taking off or landing using the guide mechanism 20 and the anchoring mechanism 22. Alternatively, a plurality of lavatory units 18 may be provided as a single integrated whole, and moved to the front position P1 during takeoff and landing and to the rear position P2 when not taking off or landing using the guide mechanism 20 and the anchoring mechanism 22 to yield effects similar to those of the first and second embodiments.

In the example illustrated in FIG. 9, multiple (two) lavatory units 18 are disposed in a row along the longitudinal direction behind each of the rear seat rows 26.

In this example, the plurality of lavatory units 18 form an integrated whole.

As a result, the outer surfaces of the forward-facing side walls of the lavatory units 18 positioned furthest to the front constitute wall 2802 facing the backrests 2402 of the rear seat rows 26 and extending in the latitudinal direction, and the outer surfaces of the rear-facing side side walls of the lavatory units 18 positioned furthest to the rear constitute walls 2804 facing the latitudinal aisle 16.

The plurality of lavatory units 18 may be moved as a whole to the front position P1 during takeoff and landing and to the rear position P2 when not taking off or landing using the guide mechanism 20 and the anchoring mechanism 22 to yield effects similar to those of the first and second embodiments.

In this example, as in the case of the first embodiment, providing a handle 40 and a housing 52 for moving the lavatory units on the walls 2804 advantageously allows the lavatory units to be more easily move to and disposed at the front position P1 and the rear position P2.

The invention claimed is:

1. An aircraft lavatory unit installation method, the aircraft comprising:
   a longitudinal aisle extending along a longitudinal direction of a fuselage and positioned at an intermediate position with respect to a latitudinal direction of the fuselage;
   a seat group in which a plurality of seat rows, the seat rows including a plurality of seats facing the front of the fuselage and arranged in rows along the latitudinal direction of the fuselage, is arranged in rows along the longitudinal direction of the fuselage on left and right sides of the longitudinal aisle;
   a latitudinal aisle extending in the latitudinal direction from a boarding entrance of the fuselage behind the seat group and connecting to the longitudinal aisle; and
   a lavatory unit provided between the latitudinal aisle and a rear seat row at a rearmost position in the seat group, the lavatory unit comprising a body frame having a plurality of walls and a toilet within the body frame, the plurality of walls including a wall extending in the latitudinal direction and facing backrests of the rear seat row and a wall extending in the latitudinal direction and facing the latitudinal aisle,
   the method comprising the steps of:
   disposing the lavatory unit at a front position in which the wall facing the backrests of the rear seat row is positioned near the backrests of the seats of the rear seat row with the backrests set to an upright position and the wall facing the latitudinal aisle is positioned at a front of the latitudinal aisle along the latitudinal direction of the fuselage, during takeoff and landing;
   disposing the lavatory unit at a rear position in which the wall facing the backrests of the rear seat row is positioned near the backrests of the seats of the rear seat row with the backrests set to a reclining position and the wall facing the latitudinal aisle is positioned on the latitudinal aisle, when the aircraft is not taking off or landing;
   using an excess space formed behind the backrests of the seats of the rear seat rows, when the backrests are in the upright position during takeoff and landing, as a space for disposing the lavatory units at the front position, and using a part of the space of the latitudinal aisle which is not frequently used, when the aircraft is not taking off or landing, as a space for disposing the lavatory units at the rear position; and utilizing the excess space behind the backrests of the seats of the rear seat rows and the part of the space of the latitudinal aisle, and reducing spacings between seat rows in the longitudinal direction for each spacing to obtain more seat rows arranged in the longitudinal direction as compared with a number of seat rows in a fuselage of an aircraft in which a lavatory unit is immovably disposed.

2. The aircraft lavatory unit installation method according to claim 1, wherein a plurality of lavatory units is provided in a row in the latitudinal direction, and the plurality of lavatory units is disposed at the front position during takeoff and landing and at the rear position when not taking off or landing.

3. The aircraft lavatory unit installation method according to claim 1, wherein a plurality of lavatory units is provided in a row in the longitudinal direction, the plurality of lavatory units forming an integrated whole, a forward-facing wall of the lavatory unit positioned furthest to the front among the integrated plurality of lavatory units constitutes the wall facing the backrests of the rear seat row, and the plurality of lavatory units are disposed as an integrated whole at the front position during takeoff and landing and at the rear position when not taking off or landing.

\* \* \* \* \*